(12) United States Patent
Schmitt et al.

(10) Patent No.: US 9,378,115 B2
(45) Date of Patent: Jun. 28, 2016

(54) BASE LINE FOR CODE ANALYSIS

(71) Applicants: Andreas Simon Schmitt, Kaiserslautern (DE); Klaus Ziegler, Neidenstein (DE); Fabian Vetter, St. Leon-Rot (DE); Johannes Marbach, Schwetzingen (DE)

(72) Inventors: Andreas Simon Schmitt, Kaiserslautern (DE); Klaus Ziegler, Neidenstein (DE); Fabian Vetter, St. Leon-Rot (DE); Johannes Marbach, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/490,142

(22) Filed: Sep. 18, 2014

(65) Prior Publication Data
US 2016/0085659 A1 Mar. 24, 2016

(51) Int. Cl.
*G06F 11/36* (2006.01)
*G06F 9/44* (2006.01)

(52) U.S. Cl.
CPC ........ *G06F 11/3616* (2013.01); *G06F 11/3664* (2013.01)

(58) Field of Classification Search
CPC .......................... G06F 11/3616; G06F 11/3664
USPC ....................................................... 717/126
See application file for complete search history.

(56) References Cited

U.S. PATENT DOCUMENTS

2003/0135481 A1* 7/2003 Helmes .................. G06Q 10/10

OTHER PUBLICATIONS

Buchwiser et al., "Experiences and Results from Establishing a Software Cockpit at BMD Systemhaus", IEEE, 2009, 7pg.*
Goede et al., "Delta Analysis", CQSE GmbH, 2012, 2pg.*
Haisjackl et al., "RisCal—A Risk Estimation Tool for Software Engineering Purposes", IEEE, 2013, 8pg.*
Heidrich et al., "Goal-Oriented Setup and Usage of Custom-Tailored Software Cockpits", Springer-Verlag, 2008, 15pg.*
Heidrich et al., "Implementing Software Project Control Centers: An Architectural View", Springer-Verlag, 2008, 14pg.*
Larndorfer et al., "TestCockpit: Business Intelligence for Test Management", Software Competence Center Hagenberg GmbH, 2007, 2pg.*
Moser et al., "Engineering Project Management Using the Engineering Cockpit", IEEE, 2011, 6pg.*
Munch et al., "Software project control centers: concepts and approaches", Elsevier, 2002, 17pg.*
Neumann et al., "Cockpit Based Management Architectures", Springer-Verlag, 2009, 14pg.*
Weiss et al., "Software Engineering—Processes and Tools", Springer, 2009, 89pg.*

* cited by examiner

*Primary Examiner* — Ryan Coyer
(74) *Attorney, Agent, or Firm* — Schwegman Lundberg & Woessner, P.A.

(57) ABSTRACT

In an example embodiment, static code analysis is performed by designating a first portion of the computer code as base line code. A check run is then performed on the base line code, resulting in one or more findings, with each finding identifying a flaw in the base line code discovered by the check run. The one or more findings may then be designated as a base line. Then a subsequent check run on a modified version of the computer code is performed, resulting in one or more subsequent findings. The one or more findings of the base line are then subtracted from the one or more subsequent findings, resulting in a modified version of the one or more subsequent findings. The modified version of the one or more subsequent findings may then be displayed on a display.

20 Claims, 7 Drawing Sheets

BASE LINE FOR CODE ANALYSIS

TECHNICAL FIELD

This document generally relates to the analysis of computer code. More specifically, this document relates to code analysis using a base line.

BACKGROUND

Static code analysis is the analysis of computer software performed without actually executing the software being analyzed. The term is usually applied to the analysis performed by an automated tool. The analyses performed by these tools vary from those that only consider the behavior of individual statements and declarations to those that include an analysis of the complete source code of a program. Modern static check tools can be integrated into a development environment. Such an integration might, for example, highlight flawed code while it is being typed. Such early feedback aids in improving quality and reducing costs.

One theory of code development is that it is better to fix every flaw as soon as it is detected. While this theory works well for new code, applying it to legacy code can present a problem. Typically, the legacy code has not followed newer rules of programming and thus static analysis of legacy code can result in a huge number of "errors" detected. Legacy code is code that has been written before a new rule shall be applied to the code. Solving for all of these errors may stall development time and introduce new risk (as each change bears the risk of introducing new flaws).

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, a mechanism is provided that allows for new programming rules and error checking rules to be applied to new code or altered legacy code, but not to original legacy code. In a broader example embodiment, a programmer or other user is able to choose code to which the rules will be applied and/or not applied, allowing, for example, a user to cause a static code analysis tool to ignore "errors" in particular portions of code, whether legacy or not.

In an example embodiment, a "base line" is set. The base line describes all rule violations at a certain point in time or with regard to a certain section of code. These recorded violations can then be considered "sanitized" from that point forward. When a code analysis is run in the future, the base line violates get subtracted from the result of the analysis. As an effect, the new results will show up with findings only for the non-base line code.

Use of the base line described above helps to increase software quality (and thus saves software maintenance costs). In the case of legacy code, there is no need to adapt running legacy code to new rules, which could potentially introduce new bugs. It also makes the introduction of new checks on legacy software possible with reasonable efforts. Additionally, base line increases the acceptance of new rules by programmers. Findings get solved with a quality mindset and thus base line can lead to a better code quality.

Figure 1:
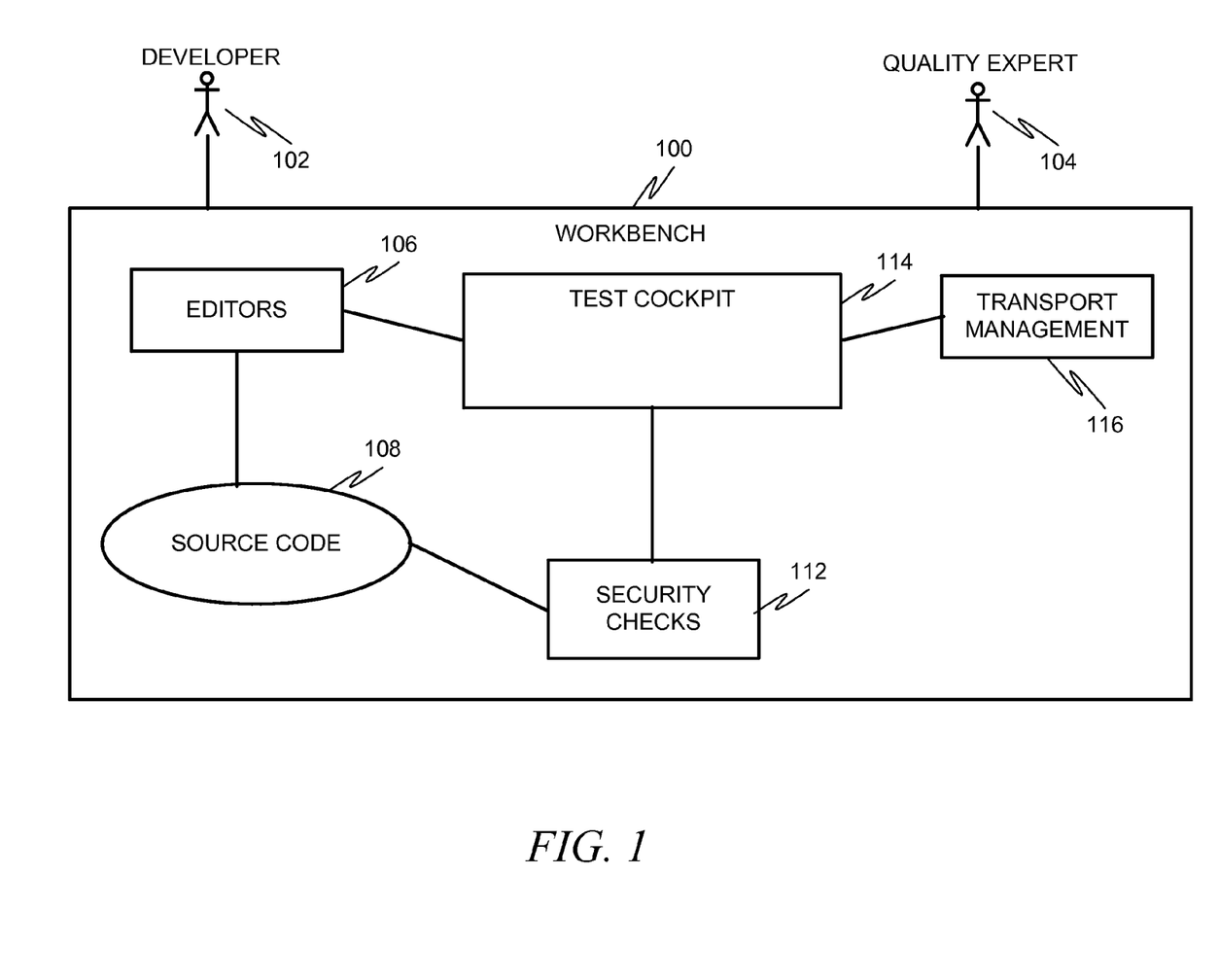
FIG. 1 is a block diagram illustrating a workbench, in accordance with an example embodiment.

In an example embodiment, static code analysis may be performed in the context of a test cockpit, which may be contained in a workbench. FIG. 1 is a block diagram illustrating a workbench, in accordance with an example embodiment. The workbench 100 may be utilized to create and analyze development objects, such as, for example, advanced business application programming (ABAP) development objects. It should be noted that some in the art tie the term workbench to an ABAP embodiment, and utilize the more general term "Integrated Development Environment" for non-ABAP embodiments. However, for purposes of this disclosure, the term "workbench" should not be limited to ABAP embodiments and generally should be interpreted as broadly as "Integrated Development Environment." A developer 102 and/or quality expert 104 can access the workbench 100, and specifically editors 106 on the workbench 100 can access source code 108, which may take the form of development objects. It should be noted that in some example embodiments the source code may include development objects not expressed in textual format, while in other embodiments it may include development objects that are expressed in textual format. Code inspector checks and security checks 112 can be executed on the source code 108 by a test cockpit 114. Results of these checks can be viewed in the test cockpit 114. The test cockpit 114 may be tightly integrated within a transport management system 116 so that if a transport is released, it can undergo a test cockpit check automatically. It should be noted that in some example embodiments when an ABAP developer releases a transport, the transport management system 116 creates a new version of the development object and transfers the development object to systems along the transport route. In non-ABAP environments, this process may differ. For example, in a Java J2EE environment, a developer may submit changes to a source control system. Then the code gets analyzed and compiled in a build server. Finally, the compiled code gets deployed to J2EE servers. In C/C#/C++ base applications, a developer may submit changes to a source control system. Then the code gets analyzed and compiled in a build server. Finally the compiled code gets installed on the target machine.

The developer 102 and/or quality expert 104 can start check runs, access findings, and correct flaws from the test cockpit 114, which is fully integrated into the workbench 100. A check run is a verification of one or more objects by one or more rules. In cases where all objects pass all rules without violation, a check result alone is passed. Otherwise, the check result contains one or more findings. A finding contains information on which piece of a development object has violated which rule. A finding can have an identity. In an example embodiment, this identity can include the location, the rule, and further characteristics.

Figure 2:
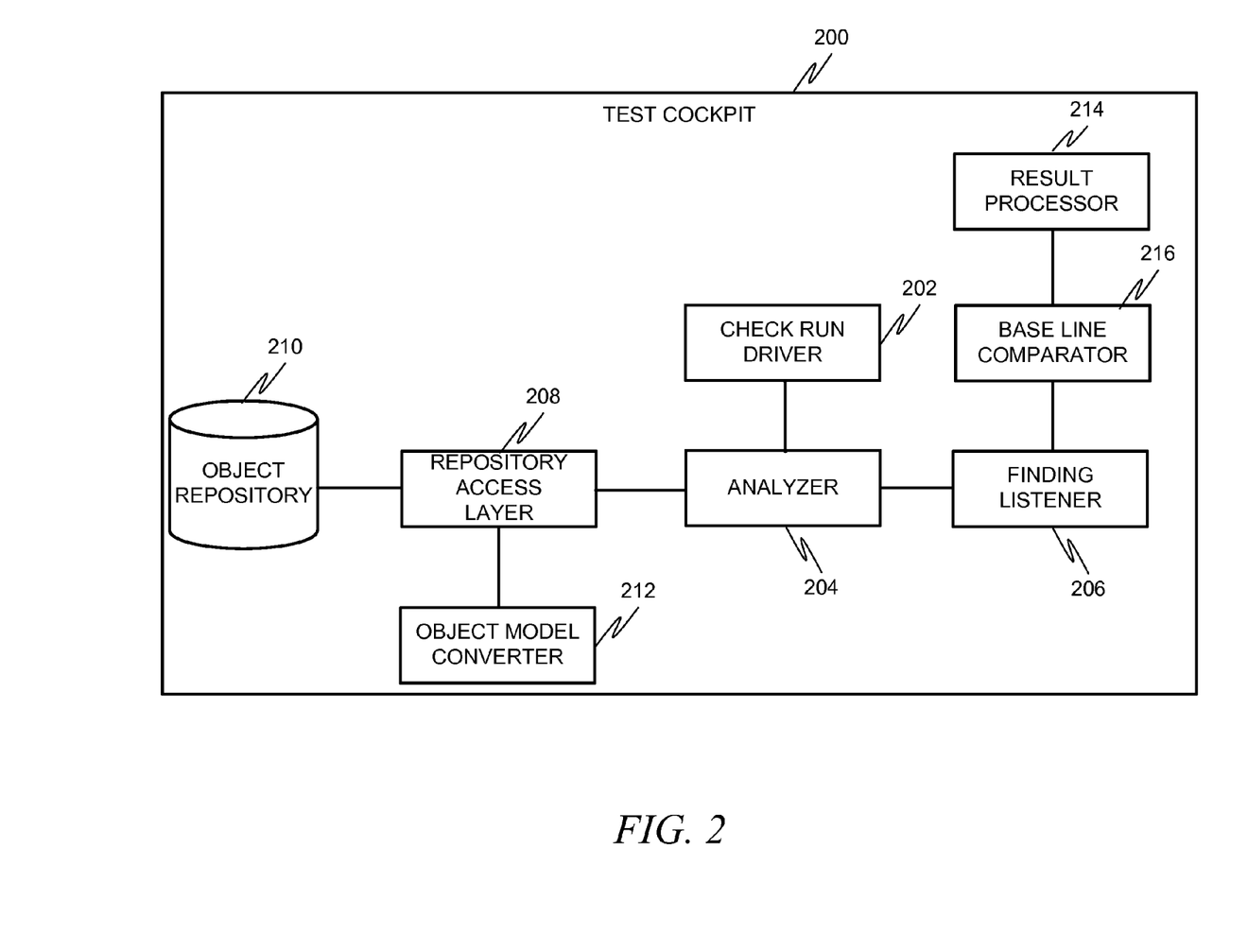
FIG. 2 is a block diagram illustrating a test cockpit, in accordance with an example embodiment.

FIG. 2 is a block diagram illustrating a test cockpit 200, in accordance with an example embodiment. In one example embodiment, test cockpit 200 may be the test cockpit 114 from FIG. 1. The test cockpit 200 may include a check run driver 202. The check run driver 202 interprets a check run configuration into an execution plan. It may map a description of which rules should be carried out to concrete functionalities. For example, a rule "Nesting Depth" may get mapped to a class "CL_CI_TEST_NESTING_DEPTH." The check run driver 202 may also convert the description of which development objects to analyze into a list of object names. In some example embodiments, the check run driver 202 may also decide whether the check run should be carried out sequentially or in parallel (to speed computation). For each rule part of a configuration, a check run driver 202 may pass the corresponding development object to an analyzer 204.

The analyzer 204 may validate that a development object adheres to a rule. The analyzer 204 may request a model of the development object and inspect the model object for possible rule violations. In cases where a rule is violated, the analyzer 204 may report a finding to the finding listener 206, which will be described in more detail later.

For example, an analyzer 204 corresponding to "CL_CI_TEST_NESTING_DEPTH" may ensure the rule "Nesting Depth=<3" for PROGRAM_X is met. First, the analyzer 204 may acquire a model of PROGRAM_X in the form of an abstract syntax tree. Then the analyzer 204 may inspect the abstract syntax tree for the characteristic nesting depth. In the case that the nesting depth exceeds the upper limit of 3 control structures, then the analyzer 204 reports the violation to the finding listener 206. It should be noted that while in this example embodiment the analyzer 204 is described as acquiring the model of the development object, in other example embodiments the check run driver 202 acquires the model of the development object and passes it to the analyzer 204. It should be noted that while one analyzer 204 is pictured, in some example embodiments multiple analyzers 204 are provided, one for each rule being analyzed.

A repository access layer 208 provides an abstraction from an object repository 210 and provides a mechanism to create the model representation of a development object stored in the object repository 210. The object repository 210 may be, for example, a file or database table on the machine where the analysis is carried out. In cloud or remote scenarios, the object repository 210 can be located on any machine. In offline scenarios or remote scanning, the repository content can be stored in extracted archives.

In an example embodiment, due to the fact that the computation of models can utilize a significant amount of resources, the repository access layer 208 may provide caching techniques in case an identical model is requested by multiple check rule implementations.

An object model converter 212 may take the raw format of a development object as input and return a model representation as output. For example, the source code of a program may get passed as a text array as input into the object model converter 212, which may return an Abstract Syntax Tree (AST) representation.

The finding listener 206 may accept the finding from the analyzer 204 and pass it to a result processor 214. The finding listener 206 may be, for example, an internal application program interface (API) used to decouple the analyzer 204 from the details of the further processing.

The result processor 214 may store the findings into a result repository (not shown). In another example embodiment, the result processor 214 is a user interface that directly displays the findings (without storing them prior in a repository).

In an example embodiment, a base line comparator 216 is located between the finding listener 206 and the result processor 214. The base line comparator 216 suppresses or marks findings contained in base line code before they are passed to the result processor 214. The processes for defining and utilizing base lines will now be discussed in detail.

Figure 3:
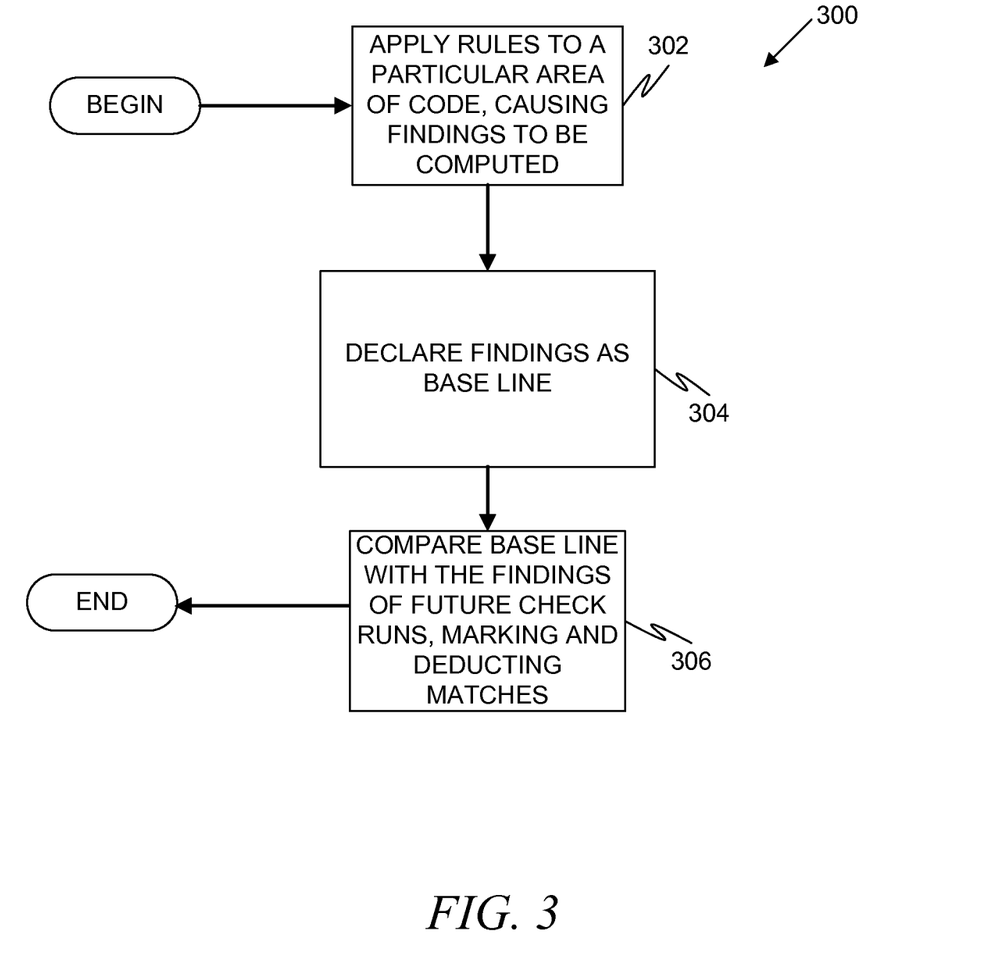
FIG. 3 is a flow diagram illustrating a method, in accordance with an example embodiment, of utilizing a base line.

Defining a base line may be performed whenever new rules are applied to new development objects (or changes to existing development objects) only. In such a scenario, any rule violation in the base line (which may be, for example, unaltered legacy code) is regarded as sanitized. FIG. 3 is a flow diagram illustrating a method 300, in accordance with an example embodiment, of utilizing a base line. At operation 302, rules are applied to a particular area of code, thereby causing findings to be computed. This particular area of code may be an area the user or administrator wishes to exclude from further code analysis. Such area of code may be called "base line code."

At operation 304, the findings are declared as base line. At operation 306, the base line is compared with findings of future check runs, and marking and deducting matches completed.

The marking and deducting of matches may be performed by assigning an identity for each finding. The identity is defined by the characterizing attributes of the finding. Typically, the violated rule and the location are part of these characteristics. For example, a finding for a too deeply nested source code may include the line and contain the location and the rule name. The rule can be described by the name/id of the corresponding analyzer and the rule parameters (e.g., the name of the Analyzer "CL_CI_TEST_NESTING_DEPTH" with the rule parameter "<=3" uniquely describing the rule "NestingDepth<=3").

On first glance, the physical location of a statement is a natural candidate for the identity of a finding. However, this approach may break when the development object gets changed. For example, an INCLUDE_X may contain statements in lines 120 and 240 that violate a rule. The line number as part of the identity may ensure that the findings can be identified. However, if a comment line is added at line 10, this causes the flawed statements to be located in lines 121 and 241. Therefore, in an example embodiment, semantic locations may be utilized over physical locations. A semantic location may be derived from the model representation and identifies one or more elements of the model. For example, in the following code:

```
class Sample.
    method get_Sample.
        result= 'SAMPLE'.
    endmethod.
```

```
method get_Name.
    result = Reader=>get_Text( ).
endmethod.
endclass.
``` the location could be expressed by identifying a physical location, such as Sample, line 4; or it could be expressed by identifying semantic location, such as class "Sample," method "get_Sample," 1$^{st}$ statement. In an example embodiment, statement tokens can be used instead of a statement index.

In an example embodiment, each model used in the test cockpit 200 is accompanied by reusable services to provide a semantic location of elements of the model.

Some rules ensure not only the correctness of a single element of the model but the consistency of several model elements. For example, a rule "XSS Backdoor" may ensure that data and program flow does not contain security loopholes. The XSS Analyzer then needs to relate several methods and statements of the AST model in such a scenario. Violations of rules that check the consistency of several model elements may use an identity that covers all involved elements. In such cases, semantic location of the elements is the combination of the semantic location of each involved element.

In an example embodiment, the overall identity of a finding may be the combination of the location, the rule, and further characteristics, possibly via concatenation.

The combination of many characteristics may lead to a certain amount of data that has a negative impact on the resource need in terms of memory and computation times. These negative effects can be optionally softened by using a hashsum or checksum algorithm of the full identity for the comparison logic. For example, the identity "NestingDepth<=3, Class: Sample, Method: get_Sample; 1$^{st}$ Statement" can be expressed as a number computed by a cyclical redundancy check (CRC).

Defining the base line may be performed by having the test cockpit 200 offer an option to convert a check run to the initial base line. As a process, this result will be computed by a check run containing new rules only. Further contents can be added to the initial base line by merging findings of further check runs into the base line.

Contents of the base line can be deleted manually. It is also possible to remove contents by comparing the base line with the result of a current check run. For example, the base line may sanitize findings that no longer appear. In such a scenario, content in the base line that matches no finding in a current reference run can be retired.

The base line can be stored in the result repository. Base line content can be stored and displayed similar to findings.

Most often, sanitized findings need not even be contained in the result. The result display and mailer demons on findings, therefore, do not need to utilize or display sanitized findings. Quality reporting, however, may wish to include sanitized findings. Therefore, in an example embodiment, an option is provided allowing a user to select whether to have the results show sanitized findings or not.

The object model converter 212 may offer support to compute a semantic location of single or multiple elements, in order to facilitate the semantic location tracking for the base line. The analyzer 204 may then consume output of the object model converter 212 and combine the rule identity with the location identity into a finding identity. The base line comparator 216 suppresses or marks findings contained in base line code before they are passed to the result processor 214.

The base line comparator 216 compares the identity of the findings with the content of the base line. In case a finding matches content of the baseline, the finding is regarded as sanitized. Depending on the configuration of the check run, sanitized findings may get marked or discarded.

Figure 4:
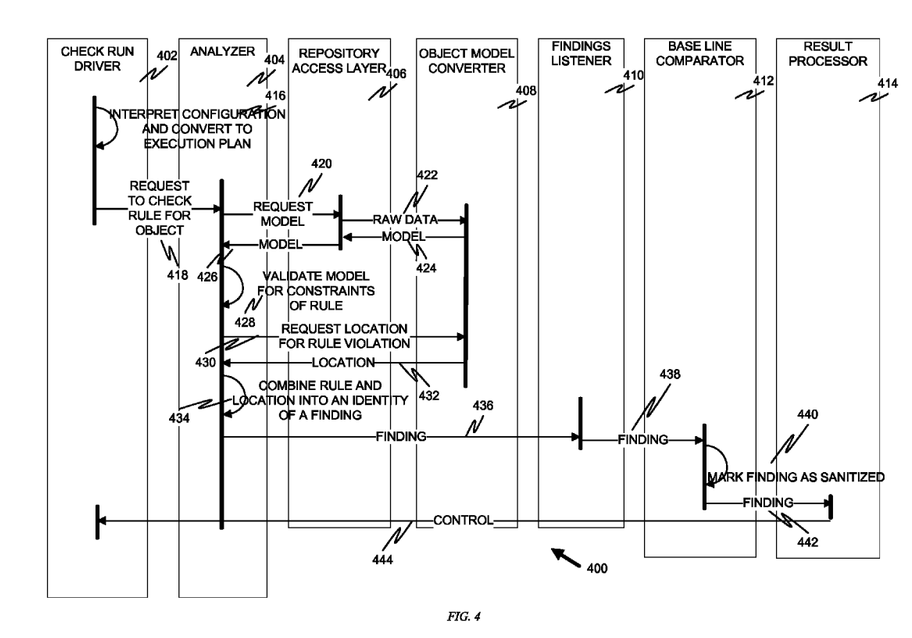
FIG. 4 is a sequence diagram illustrating a method, in accordance with an example embodiment, of performing code analysis using a base line.

FIG. 4 is a sequence diagram illustrating a method 400, in accordance with an example embodiment, of performing code analysis using a base line. The method 400 may utilize a check run driver 402, an analyzer 404, a repository access layer 406, an object model converter 408, a findings listener 410, a base line comparator 412, and a result processor 414.

At operation 416, the check run driver 402 interprets the configuration of the check run and converts it into an execution plan. Then, at operation 418, the check run driver 402 requests that analyzer 404 check a rule for an object.

At operation 420, the analyzer 404 then requests a model of the development object from the repository access layer 406. The repository access layer 406 then retrieves the raw data of the development object from a local or remote repository and passes the raw data to the object model converter 408 at operation 422, requesting a model. The object model converter 408 converts the raw data into model representation, and then at operation 424 passes the model back the repository access layer 406, which at operation 426 passes the model back to the analyzer 404.

At operation 428, the analyzer validates the model for the constraints of the rule. For each violation of the rule, at operation 430 the analyzer 404 requests the location of the involved elements from the object model converter 408. At operation 432, the object model converter 408 passes the element's location back to the analyzer 404. At operation 434, the analyzer 404 combines the rule and the location into the identity of the finding.

At operation 436, the analyzer 404 reports the finding to the findings listener 410. At operation 438, the findings listener 410 propagates the finding to the base line comparator 412, which at operation 440 marks findings sanitized by the base line. Then at operation 442, the base line comparator 412 propagates the finding to the result processor 414. At operation 444, the analyzer 404 returns control back to the check run driver 402.

In an example embodiment, comparison of sanitized findings of a base line with findings of a current check run may be performed using a delta algorithm. If a current finding matches a finding of the base line, it is regarded as sanitized and is not considered as a (new) flaw.

Figure 5:
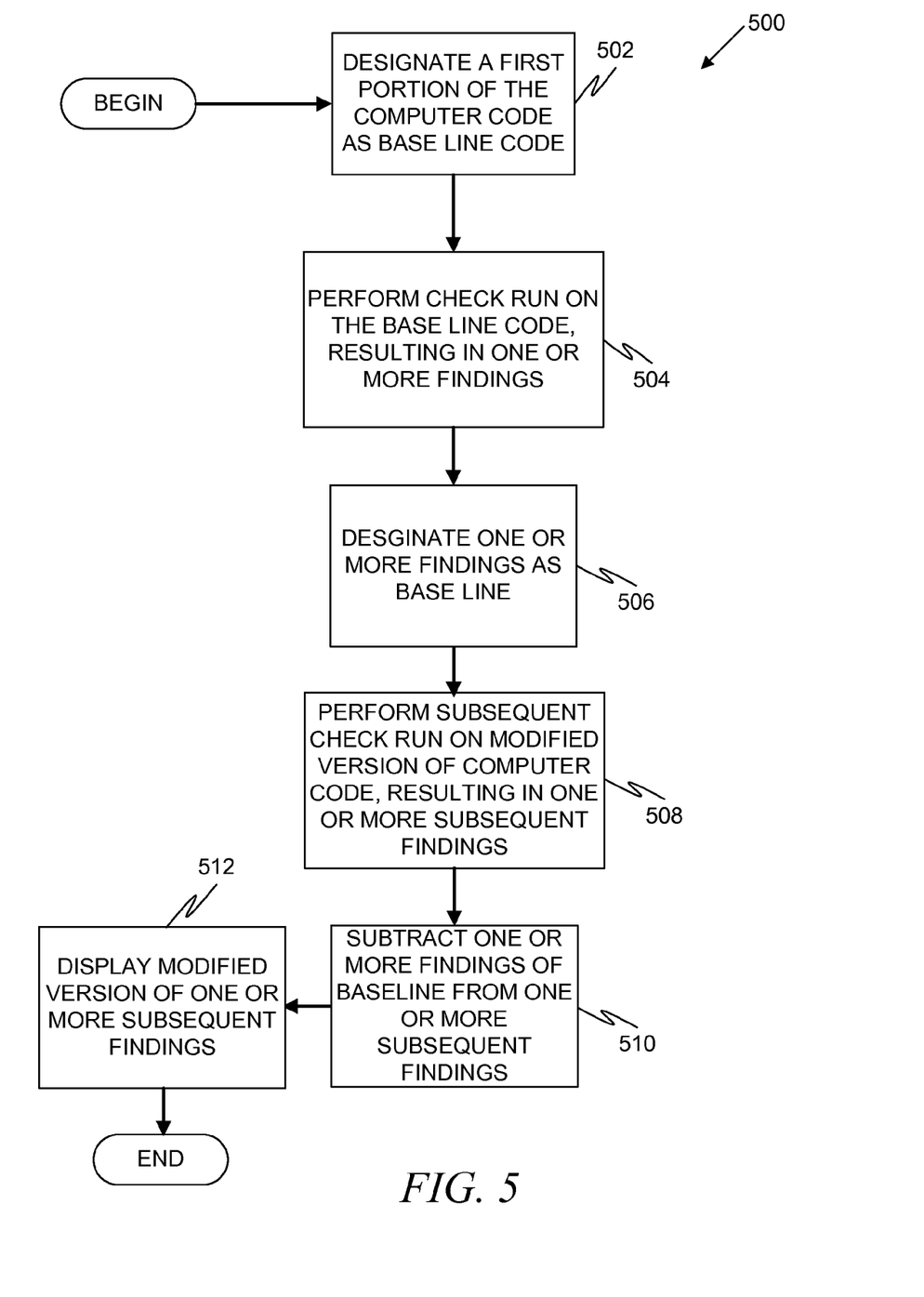
FIG. 5 is a flow diagram illustrating a method, in accordance with an example embodiment, of performing static code analysis on computer code.

FIG. 5 is a flow diagram illustrating a method 500, in accordance with an example embodiment, of performing static code analysis on computer code. At operation 502, a first portion of the computer code is designated as base line code. At operation 504, a check run is performed on the base line code, resulting in one or more findings, with each finding identifying a flaw in the base line code discovered by the check run. At operation 506, the one or more findings are designated as a base line. At operation 508, a subsequent check run is performed on a modified version of the computer code, resulting in one or more subsequent findings. At operation 510, the one or more findings of the base line are subtracted from the one or more subsequent findings, resulting in a modified version of the one or more subsequent findings. At operation 512, the modified version of the one or more subsequent findings is displayed on a display.

Example Mobile Device

Figure 6:
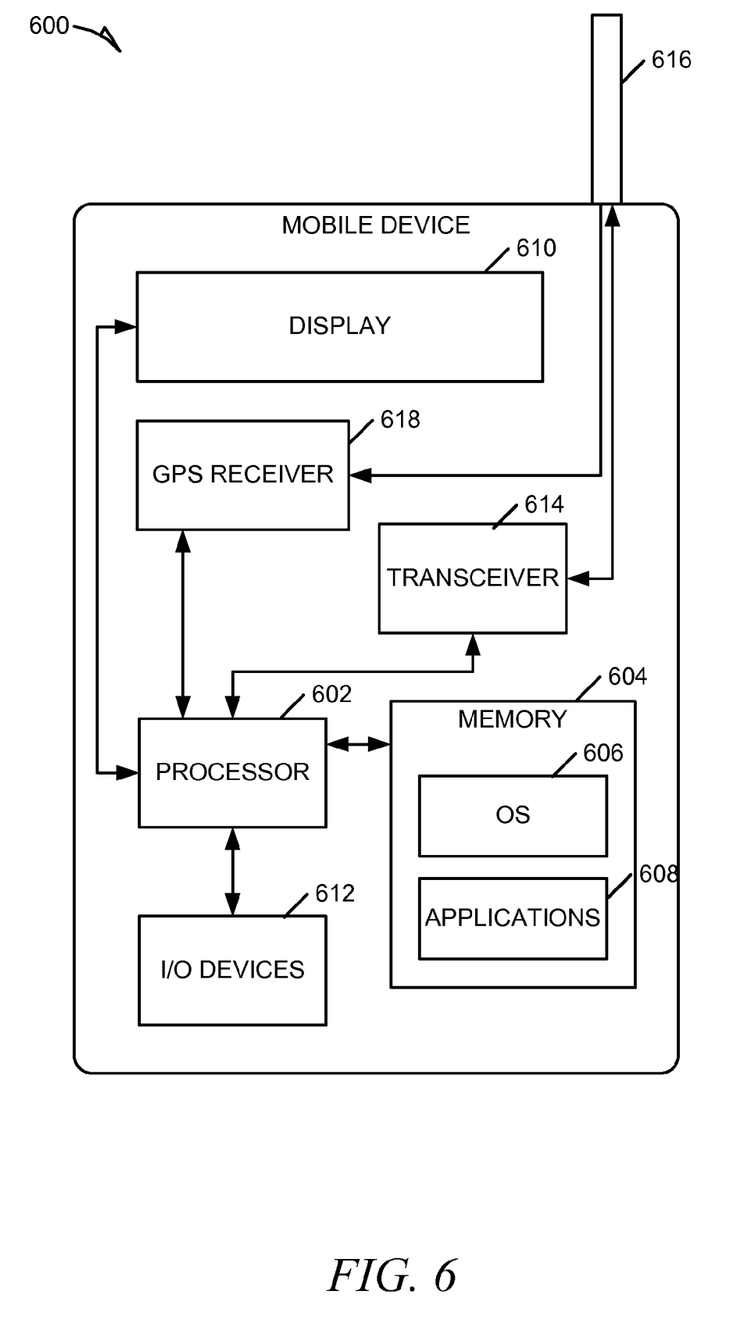
FIG. 6 is a block diagram illustrating a mobile device, according to an example embodiment.

FIG. 6 is a block diagram illustrating a mobile device 600, according to an example embodiment. The mobile device 600 can include a processor 602. The processor 602 can be any of a variety of different types of commercially available processors 602 suitable for mobile devices 600 (for example, an XScale architecture microprocessor, a microprocessor without interlocked pipeline stages (MIPS) architecture processor, or another type of processor 602). A memory 604, such as a random access memory (RAM), a flash memory, or other type of memory, is typically accessible to the processor 602. The memory 604 can be adapted to store an operating system (OS) 606, as well as application programs 608. The processor 602 can be coupled, either directly or via appropriate intermediary hardware, to a display 610 and to one or more input/output (I/O) devices 612, such as a keypad, a touch panel sensor, a microphone, and the like. Similarly, in some embodiments, the processor 602 can be coupled to a transceiver 614 that interfaces with an antenna 616. The transceiver 614 can be configured to both transmit and receive cellular network signals, wireless data signals, or other types of signals via the antenna 616, depending on the nature of the mobile device 600. Further, in some configurations, a Global Positioning System (GPS) receiver 618 can also make use of the antenna 616 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors 602 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 602 or other programmable processor 602) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 602 configured using software, the general-purpose processor 602 can be configured as different hardware-implemented modules at different times. Software can accordingly configure a processor 602, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 602 that are temporarily configured (e.g., by software) or permanently configured to perform the relevant operations. Whether temporarily or permanently configured, such processors 602 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or processors 602 or processor-implemented modules. The performance of certain of the operations can be distributed among the one or more processors 602, not only residing within a single machine, but deployed across a number of machines. In some example embodiments, the processor 602 or processors 602 can be located in a single location (e.g., within a home environment, an office environment or a server farm), while in other embodiments the processors 602 can be distributed across a number of locations.

The one or more processors 602 can also operate to support performance of the relevant operations in a "cloud computing" environment or as a "software as a service" (SaaS). For example, at least some of the operations can be performed by a group of computers (as examples of machines including processors 602), these operations being accessible via a network (e.g., the Internet) and via one or more appropriate interfaces (e.g., APIs).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 602, a computer, or multiple computers.

A computer program can be written in any form of programming language, including compiled or interpreted languages, and it can be deployed in any form, including as a stand alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 602 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 602), or in a combination of permanently and temporarily configured hardware can be a design choice. Below are set out hardware (e.g., machine) and software architectures that can be deployed, in various example embodiments.

Example Machine Architecture and Machine-Readable Medium

Figure 7:
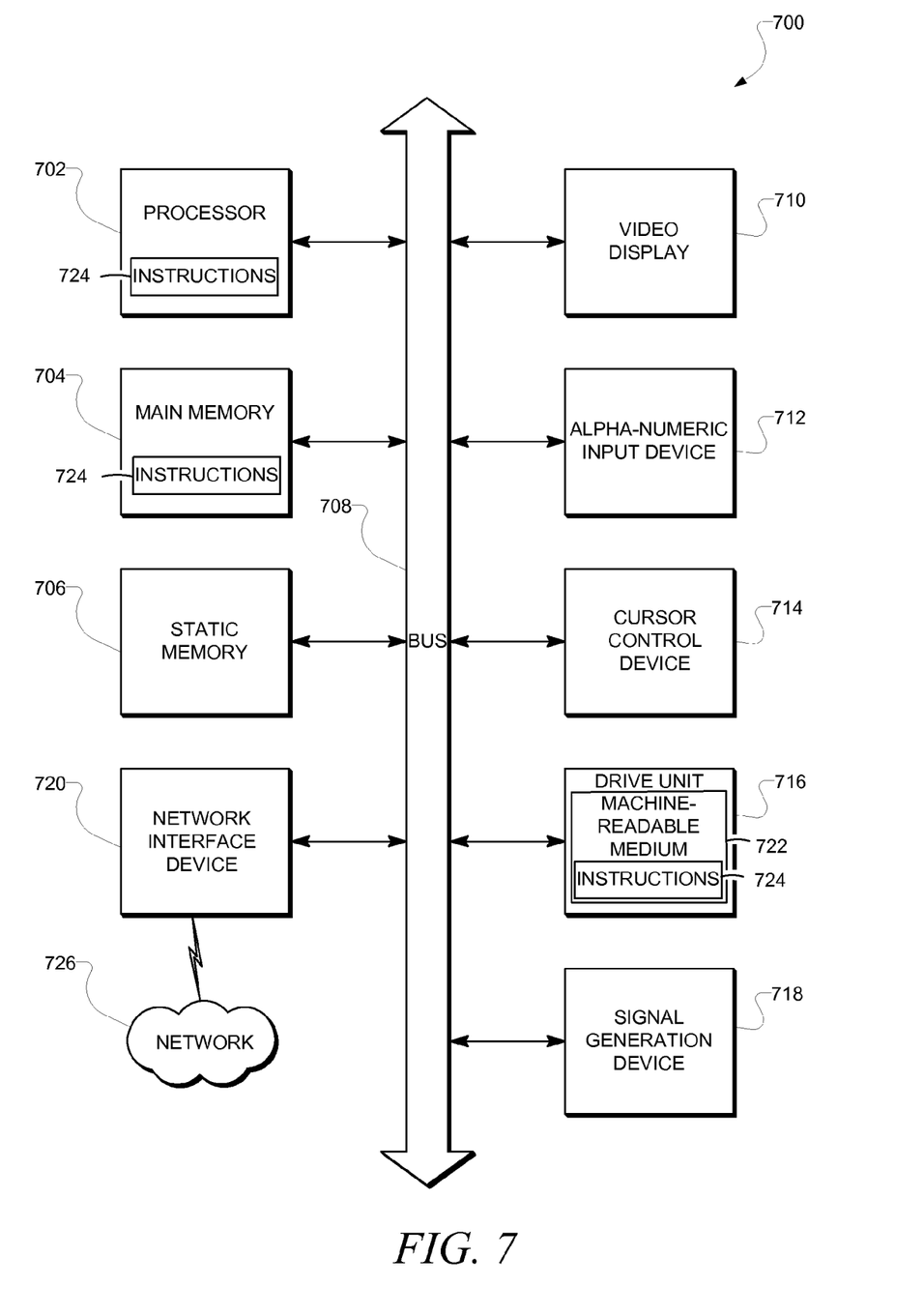
FIG. 7 is a block diagram of machine in the example form of a computer system within which instructions, for causing the machine to perform any one or more of the methodologies discussed herein, can be executed.

FIG. 7 is a block diagram of machine in the example form of a computer system 700 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 can further include a video display 710 (e.g., a liquid crystal display (LCD) or a cathode ray tube (CRT)). The computer system 700 also includes an alpha-numeric input device 712 (e.g., a keyboard or a touch-sensitive display screen), a cursor control device 714 (e.g., a mouse), a drive unit 716, a signal generation device 718 (e.g., a speaker), and a network interface device 720.

Machine-Readable Medium

The drive unit 716 includes a machine-readable medium 722 on which is stored one or more sets of instructions (e.g., software) 724 embodying or utilized by any one or more of the methodologies or functions described herein. The instructions 724 can also reside, completely or at least partially, within the main memory 704 and/or within the processor 702 during execution thereof by the computer system 700, with the main memory 704 and the processor 702 also constituting machine-readable media.

While the machine-readable medium 722 is shown in an example embodiment to be a single medium, the term "machine-readable medium" can include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions 724 for execution by the machine and that cause the machine to perform any one or more of the methodologies of the present disclosure or that is capable of storing, encoding or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 can further be transmitted or received over a communications network 726 using a transmission medium. The instructions 724 can be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 724 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of performing static code analysis on computer code, the method comprising:
designating a first portion of the computer code as base line code;
performing, at a check run driver in a test cockpit, a check run on the base line code, resulting in one or more findings, each finding identifying a flaw in the base line code discovered by the check run, the performing of the check run including requesting a model of each development object to be analyzed in the base line code, the model including an abstracted representation of a corresponding development object, identifying a semantic location for each finding and including the semantic location in the finding, the semantic location indicating a location of the finding within the model based on a relationship between the location and one or more elements in the model;
designating the one or more findings as a base line;
performing, at the check run driver, a subsequent check run on a modified version of the computer code, resulting in one or more subsequent findings;
subtracting, at a base line comparator in the test cockpit, the one or more findings of the base line from the one or more subsequent findings, resulting in a modified version of the one or more subsequent findings; and
displaying the modified version of the one or more subsequent findings on a display.

2. The method of claim 1, wherein the first portion of the computer code is legacy code and a remainder of the computer code is not legacy code, wherein legacy code is code that has been written before a new rule is to be applied on the code.

3. The method of claim 1, wherein the designating the one or more findings as a base line comprises creating an identity for each of the one or more findings, the identity based on an identification of a rule whose violation caused the finding and based on a location of a line or lines in the first portion that violated the rule.

4. The method of claim 1, wherein the model is obtained from a cache of models created by a repository access layer from an abstract syntax tree for each development object.

5. The method of claim 3, wherein the location is a combination of locations of multiple lines of the first portion in a case where multiple lines of the first portion violated the rule.

6. The method of claim 1, wherein, for any finding derived from a rule that verities consistency of multiple model elements, combing semantic locations for each of the model elements into a single semantic location.

7. A system comprising:
a workbench comprising:
a memory containing source code to be analyzed;
one or more editors comprising one or more processors and configured to edit the source code;
a test cockpit comprising:
a check run driver configured to create an execution plan from a listing of rules to be analyzed;
an object repository;
a repository access layer configured to control access the object repository;
an analyzer configured to perform the execution plan on one or more development objects in the object repository, the one or more development objects including one or more development objects identified as base line development objects, the performance of the execution plan resulting in an analysis of the one or more development objects using the rules and outputting one or more findings, the performing of the execution plan including requesting a model of each development object to be analyzed in the base line code, the model including an abstracted representation of corresponding development object, identifying a semantic location for each finding and including the semantic location in the finding, the semantic location indicating a location of the finding within the model based on a relationship between the location and one or o elements in the model;
a base line comparator configured to mark the one or more findings corresponding to base line development objects as base line and to compare subsequent findings to the base line; and
a result processor configured to display findings that the base line comparator has identified as being different than the base line while not displaying findings that the base line comparator has identified as being the same as the base line.

8. The system of claim 7, wherein the source code includes definitions of development objects not expressed in textual format.

9. The system of claim 7, wherein the source code includes definitions of development objects expressed in textual format.

10. The system of claim 7, wherein the workbench is configured to perform an automatic check run whenever source code gets submitted to the object repository.

11. The system of claim 10, wherein the workbench is further configured to perform the automatic check run before code changes are transferred to an entity outside of the system.

12. The system of claim 10, wherein a build server on the workbench executes the automatic check run during or after code changes have been submitted to the object repository.

13. The system of claim 7, wherein the check run driver is further configured to interpret a check run configuration into the execution plan.

14. The system of claim 7, wherein the check run driver further determines whether the execution plan should be executed sequentially or in parallel.

15. The system of claim 7, wherein the object repository is located on a machine that also contains the analyzer.

16. The system of claim 7, wherein each finding additionally includes an identity, the identity stored in the finding as a hashsum of a full identity.

17. The system of claim 7, further comprising an object model converter which takes a raw format of a development object as input and returns a model representation as output.

18. A non-transitory machine-readable storage medium comprising instructions, which when implemented by one or more machines, cause the one or more machines to perform operations for performing static code analysis on computer code, the operations comprising:
designating a first portion of the computer code as base line code;

performing a check run on the base line code, resulting in one or more findings, each finding identifying a flaw in the base line code discovered by the check run, the performing of the check run including requesting a model of each development object to be analyzed in the base line code the model including an abstracted representation of a corresponding development object, identifying a semantic location for each finding and including the semantic location in the finding, the semantic location indicating a location of the finding within the model based on a relationship between the location and one or more elements in the model;

designating the one or more findings as a base line;

performing a subsequent check run on a modified version of the computer e, resulting in one or more subsequent findings;

subtracting the one or more findings of the base line from the one or more subsequent findings, resulting in a modified version of the one or more subsequent findings; and displaying the modified version of the one or more subsequent findings on a display.

19. The non-transitory machine-readable storage medium of claim 18, wherein the designating the one or more findings as a base line comprises creating an identity for each of the one or more findings, the identity based on an identification of a rule whose violation caused the finding and based on a location of a line or lines in the first portion that violated the rule.

20. The non-transitory machine-readable storage medium of claim 19, wherein the location is a semantic location.

* * * * *